United States Patent
Schneider et al.

(10) Patent No.: US 12,380,600 B2
(45) Date of Patent: Aug. 5, 2025

(54) REARVIEW ASSEMBLY ADJUSTMENT SYSTEM

(71) Applicant: GENTEX CORPORATION, Zeeland, MI (US)

(72) Inventors: Jim L. Schneider, Hudsonville, MI (US); Matthew W. Remijn, Grand Rapids, MI (US); Joshua D. Lintz, Allendale, MI (US)

(73) Assignee: GENTEX CORPORATION, Zeeland, MI (US)

( * ) Notice: Subject to any disclaimer, the term of this patent is extended or adjusted under 35 U.S.C. 154(b) by 333 days.

(21) Appl. No.: 17/893,332

(22) Filed: Aug. 23, 2022

(65) Prior Publication Data

US 2023/0055290 A1 Feb. 23, 2023

Related U.S. Application Data

(60) Provisional application No. 63/235,830, filed on Aug. 23, 2021.

(51) Int. Cl.
*G06T 7/80* (2017.01)
*B60R 1/04* (2006.01)
(Continued)

(52) U.S. Cl.
CPC .................. *G06T 7/80* (2017.01); *B60R 1/04* (2013.01); *B60R 1/12* (2013.01); *B60R 1/29* (2022.01); *B60R 2001/1253* (2013.01)

(58) Field of Classification Search
CPC ............. G06T 7/80; G06T 2207/30204; G06T 2207/30244; G06T 2207/30268;
(Continued)

(56) References Cited

U.S. PATENT DOCUMENTS

| 6,304,187 | B1 | 10/2001 | Pirim |
| 10,909,721 | B2 | 2/2021 | Noble et al. |

(Continued)

FOREIGN PATENT DOCUMENTS

| DE | 102014214352 A1 | 1/2016 |
| JP | 2007313950 A | 12/2007 |

(Continued)

OTHER PUBLICATIONS

International Search Report dated Dec. 6, 2022, for corresponding PCT application No. PCT/US2022/041156, 5 pages.

(Continued)

*Primary Examiner* — Matthew C Bella
*Assistant Examiner* — Nicholas John Helco
(74) *Attorney, Agent, or Firm* — Price Heneveld LLP; Brian James Brewer

(57) ABSTRACT

A system for calibrating a driver monitoring system in a vehicle comprises a rearview assembly comprising a housing, a mount secured to a vehicle surface, and a barrel extending between the housing and the mount; an imager disposed in the rearview assembly; a processor in communication with the imager; a memory comprising a file containing information on stationary landmarks proximate the imager; and a controller operable to: receive images of the vehicle's interior and calibrate the imager by identifying a substantially stationary landmark in a first image used during an initial calibration; wherein the controller is configured to re-calibrate the driver monitoring operations based, at least in part, on a detection of the substantially stationary landmark being in a different location in a second image relative to the first image. One of the ends of the barrel is connected with a moveable joint.

17 Claims, 2 Drawing Sheets

(51) Int. Cl.
  *B60R 1/12* (2006.01)
  *B60R 1/29* (2022.01)
(58) Field of Classification Search
  CPC .... G06T 5/80; G06T 7/74; G06T 5/50; G06T 7/001; G06T 7/70; G06T 7/73; G06T 7/85; G06T 7/97; G06T 2207/30208; G06T 2207/30248; B60R 1/04; B60R 1/12; B60R 1/29; B60R 2001/1253; B60R 1/02; B60R 1/025; B60R 1/26; B60R 2001/1223; B60R 1/08; B60R 1/087; B60R 2011/0033; B60W 40/08; B60K 2360/779; B60Q 3/258; B60J 5/0404; B60S 1/0885
  See application file for complete search history.

(56) References Cited

U.S. PATENT DOCUMENTS

| | | | |
|---|---|---|---|
| 2009/0179773 A1 | 7/2009 | Denny et al. | |
| 2010/0259537 A1* | 10/2010 | Ben-Himane | G06F 30/00 345/419 |
| 2011/0285856 A1 | 11/2011 | Chung | |
| 2018/0065556 A1 | 3/2018 | Boehm | |
| 2018/0108150 A1* | 4/2018 | Curtis | G06T 7/246 |
| 2019/0158813 A1* | 5/2019 | Rowell | H04N 13/111 |
| 2019/0286948 A1* | 9/2019 | Sathyanarayana | G05D 1/0251 |
| 2021/0323473 A1* | 10/2021 | Peterson | B60R 1/025 |

FOREIGN PATENT DOCUMENTS

| | | | | |
|---|---|---|---|---|
| JP | 2008013023 A | | 1/2008 | |
| JP | 2011217318 A | | 10/2011 | |
| JP | 2013166414 A | | 8/2013 | |
| JP | 2014196095 A | | 10/2014 | |
| JP | 2018077196 A | * | 5/2018 | |
| KR | 1020110064238 A | | 6/2011 | |
| WO | WO-2016012140 A1 | * | 1/2016 | G06T 7/0018 |
| WO | 2017073064 A1 | | 5/2017 | |

OTHER PUBLICATIONS

Written Opinion dated Dec. 6, 2022, for corresponding PCT application No. PCT/US2022/041156, 5 pages.

* cited by examiner

REARVIEW ASSEMBLY ADJUSTMENT SYSTEM

CROSS REFERENCE TO RELATED APPLICATIONS

This application claims the benefit of and priority to U.S. Provisional Patent Application No. 63/235,830, filed on Aug. 23, 2021, entitled "Camera-Based Rearview Assembly Orientation Adjustment System," the entire disclosure of which is hereby incorporated herein by reference.

FIELD OF THE DISCLOSURE

This disclosure relates generally to the processing of images in a rearview assembly, and in particular, to the processing of images captured by an imager in a driver monitoring system in a rearview assembly.

BACKGROUND

One or more imagers may be mounted in rearview assemblies for driver monitoring systems and may be configured to capture images, especially images of a driver of the vehicle or of certain body parts of the driver. This may enable the driver monitoring system to accurately determine the location of a driver and the driver's eye(s) for monitoring. The driver monitoring system may be calibrated with the rearview assembly in a given position. Once the driver monitoring system has been calibrated, any subsequent adjustments of the rearview assembly must be detected and quantified so that proper compensation may be applied to captured images. Existing sensors can be used to directly measure adjustments to the rearview assembly, but they are expensive.

SUMMARY

According to an aspect, a system for calibrating a driver monitoring system in a vehicle may comprise a rearview assembly comprising a housing and a mount, the mount secured to a vehicle surface, and a barrel having a first end and a second end and extending between the housing and the mount; an imager capable of capturing images, the imager disposed in the rearview assembly; a processor in communication with the imager; a memory in communication with processor, the memory comprising a file containing information on stationary landmarks proximate the imager; and a controller operable to: receive images of the vehicle's interior, and calibrate the imager. The calibration may include identifying a substantially stationary landmark in a first image used during an initial calibration. The controller may be configured to re-calibrate the driver monitoring operations based, at least in part, on a detection of the substantially stationary landmark being in a different location in a second image relative to the first image. At least one of the first end and the second end of the barrel may be connected with a moveable joint.

The captured images of the interior of the rearview assembly may include at least one stationary image landmark. The at least one stationary image landmark may be disposed within the housing. The first end of the barrel may have a moveable joint connected to the mount. The second end of the barrel may have a moveable joint connected to the housing. The file may contain information on stationary landmarks within the housing of the rearview assembly.

The controller may be configured to import an image and identify features in the image that may be known from the file. The controller may be configured to know the location of the features based on the information in the file. The controller may be configured to define a coordinate system based on the joint or joints at the ends of the barrel. The imager may be configured to relate captured images to the file to determine the relative position of the rearview assembly in relation of the original position. The controller may be configured to determine a coordinate system based on the joint or joints securing the rearview assembly to the vehicle. The controller may be configured to identify at least one feature in the file and to locate the same at least one feature in the rearview assembly. The controller may be configured to use the location of the at least one feature to determine five angles, including two pitch angles, two yaw angles, and one roll angle. The controller may be configured to, upon the determination of the five angles, calculate the location and orientation of rearview assembly. The controller may be configured to re-calibrate the driver monitoring system using the new location and orientation information.

According to an aspect, a method for calibrating a driver monitoring system may comprise: providing a rearview assembly having a driver monitoring system comprising an imager, and a memory comprising a file containing details on the interior architecture of the rearview assembly including the location of a plurality of stationary landmarks within the housing of the rearview assembly; capturing images of the interior of the rearview assembly with the imager; comparing the captured images with a file stored in memory containing details on the interior architecture of the rearview assembly; calibrating the driver monitoring system using information gained from the comparison between the captured images and the stored images.

The method further may comprise establishing image coordinates for the stationary landmarks within the rearview assembly. The method further may comprise defining initial rotations during an initial calibration of the driver monitoring system as 0, 0, 0. The method further may comprise dewarping the captured images and establishing new image coordinates for a plurality of the stationary landmarks. The method further may comprise determining position adjustment information for the rearview assembly. The method further may comprise applying position adjustment information to the captured images.

DETAILED DESCRIPTION

Figure 1:
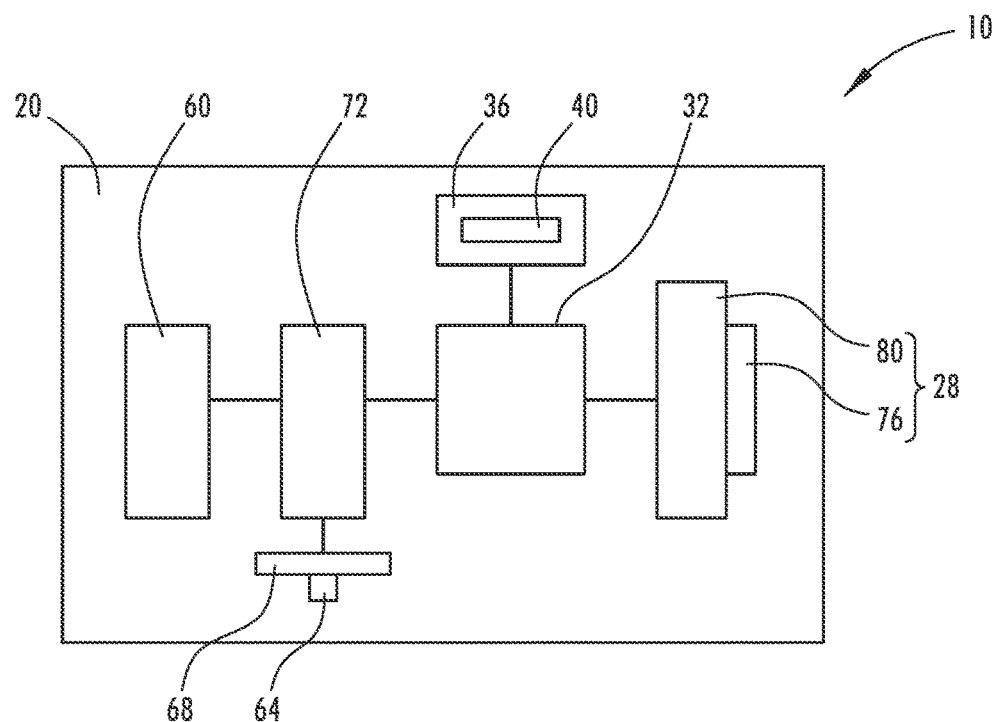
FIG. 1 illustrates a block diagram of a camera-based adjustment system for a driver monitoring system in accordance with this disclosure.

Referring to FIG. 1, a system for calibrating a driver monitoring system is generally shown at reference number 10. Calibration system 10 may comprise a driver monitoring system 20 disposed in a rearview assembly 24. Driver monitoring system 20 may comprise a camera or imager 28, a processor 32 and a memory 36. Calibration system 10 may further comprise a computer aided design (CAD) file 40 disposed in memory 36 and comprising details of stationary landmarks visible to imager such as the architecture of the interior of rearview assembly 24.

Figure 2:
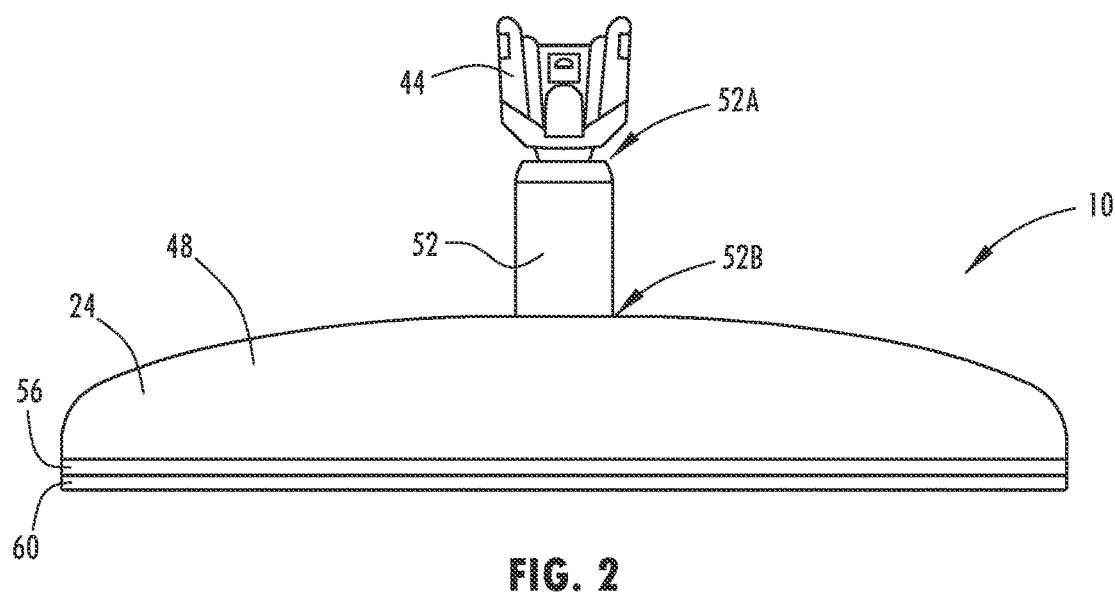
FIG. 2 illustrates a top view of a rearview assembly in accordance with this disclosure.
Figure 3:
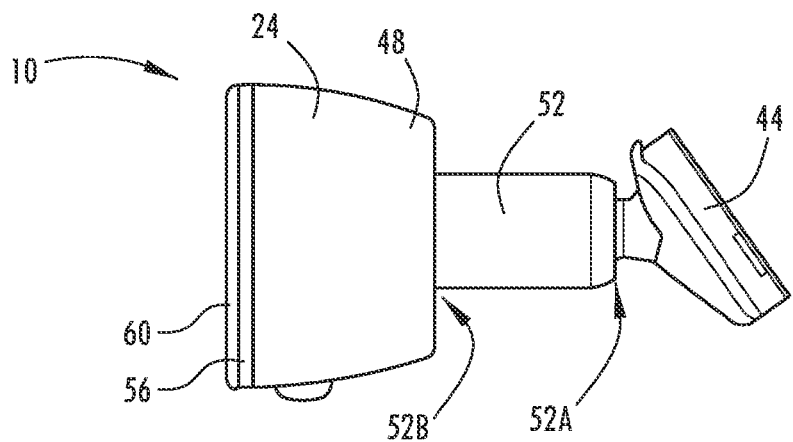
FIG. 3 illustrates a side view of the rearview assembly of FIG. 2.

As shown in FIGS. 2-3, rearview assembly 24 may comprise a mount 44, a housing 48, and a barrel 52 extending between mount 44 and housing 48. Rearview assembly 24 may be generally designed to be supported on a windshield or roof of a vehicle (not shown) via mount 44. Mount 44 may be fixedly connected with windshield or roof of vehicle via a button (not shown) or other appropriate connection element.

Barrel 52 may have a circular, oval, square, rectangular, or irregular cross-section.

Barrel 52 may have a first end 52A and a second end 52B and may extend between mount 44 and housing 48 of rearview assembly 24. In some embodiments, first end 52A of barrel 52 may be pivotally connected at mount 44 with a ball mount or other appropriate connection element. In some embodiments, first end 52A of barrel 52 may be fixedly connected at mount 44.

Similar to barrel and first end, in some embodiments, second end 52B of barrel 52 may be pivotally connected to housing 48. Second end 52B of barrel 52 may be connected to housing 48 with a ball mount (not shown) or other type of mount that may be operably coupled with the rearview assembly 24. The ball mount may be defined as part of housing 48 or may be formed on a rear wall disposed inside housing 48. Other possible constructions for the ball mount of housing 48 are also contemplated. In some embodiments, second end 52B of barrel 52 may extend directly and fixedly from housing 48.

Accordingly, housing 48 of rearview assembly 24 may be configured to be movably attached to mount 44 (i.e., may rotate along a horizontal axis and/or a vertical axis). Rearview assembly 24 may have a single moveable joint, either at first end 52A of barrel 52 and mount 44 or at second end 52B of barrel 52 and housing 48, or may have two moveable joints, one at first end 52A of barrel 52 and mount 44 and one at second end 52B of barrel 52 and housing 48.

Figure 4:
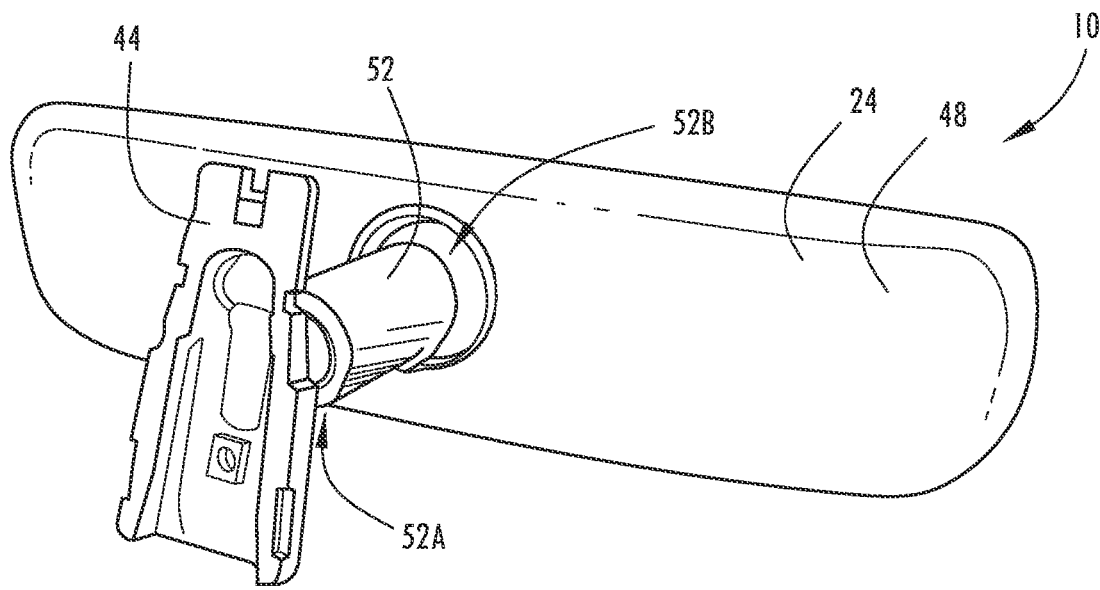
FIG. 4 illustrates a top rear perspective view of one embodiment of a rearview assembly in accordance with this disclosure.
Figure 5:
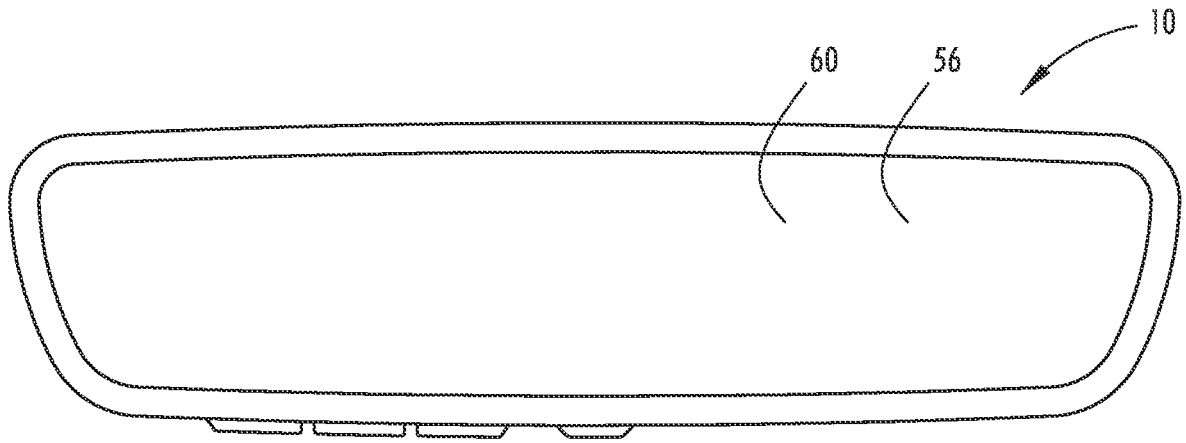
FIG. 5 is a plan view of an embodiment in accordance with this disclosure.

Referring to FIGS. 4 and 5, housing 48 may define an opening 56 with at least one of a reflective element, such as an electrochromic element, and a display element 60, configured to cover opening 56. Rearview assembly 24 may also comprise at least some components of a driver monitoring system 20 configured to perform driver monitoring functions. The components of the driver monitoring system 20 may include, but are not limited to, imager 28, processor 32, at least one light source 64, at least one printed circuit board (PCB) 68, and a controller 72. Processor 32 may be an image signal processor.

Imager 28 may be disposed inside housing 48 and may be located behind reflective element and/or display element 60. Imager 28 may include a lens 76 and an image sensor 80 such as a complementary metal-oxide-semiconductor ("CMOS") that can create image data when activated. When driver monitoring system 20 is operating, imager 28 may be configured to acquire one or more images of a feature of a driver and generate image data corresponding to the one or more acquired images. Imager 28 may capture images of the driver either intermittently or continually. Driver monitoring system 20 may monitor and capture images of at least one of predefined facial, head, and body characteristics or positions of the driver. In some embodiments, the captured images may include but are not limited to: the position and movements of the pupils of the driver's eye(s), frequency and duration of blinking, position of eyelids, head position and orientation, head movement, pulse rate, facial and eye movements, or other suitable driver performance indicators.

Imager 28 may further be capable of detecting image points within interior of rearview assembly 24 and relating them to CAD file 40 of an interior portion of rearview assembly 24. CAD file 40 may include details of the interior architecture of rearview assembly 24 such as supports, and other interior features. Driver monitoring system 20 may be calibrated initially with rearview assembly 24 in a given position. Any subsequent adjustments to the position of rearview assembly 24 may need to be detected and quantified to allow proper compensation to be applied.

Imager 28 may be configured to capture images of stationary image landmarks in an image captured when driver monitoring system is initially calibrated. When any change in the locations of the landmarks is detected, driver monitoring system 20 may need to be recalibrated. the image captured during calibration may be dewarped. Image coordinates for each landmark may be established. The world coordinate system may be defined as (0, 0, 0) at the focal point of imager 28 and rotations are defined as (0, 0, 0) when driver monitoring system 20 was initially calibrated. From here, similar world coordinates may be calculated for each of the image coordinates. The new image may be dewarped and image coordinates established for each of the landmarks.

The at least one light source 64 may comprise an infrared or near-infrared (NIR) light source. The at least one light source 64 and imager 28 may be electrically coupled to PCB 68 and may further be in communication with controller 72. In some embodiments, the at least one light source 64 may be configured to have a field of illumination that includes the driver position within the vehicle.

Processor 32 may be capable of processing images captured by imager 28. Processor 32 may be a general or application specific processor or circuit for performing calculations, handling inputs, generating outputs, and/or otherwise performing computational tasks. Processor 32 may be a microprocessor configured using various components such as a field programmable gate array (FPGA), or a combination of discrete and FPGA or the like. In some embodiments, processor 32 may be adapted to perform a plurality of functions. These functions may include but are not limited to headlamp control, lane departure warning and other driver assist features. Processor 32 may be configured to selectively activate light source 64 and process image data received from imager 28 to monitor the driver. In some embodiments, processor 32 may process the captured images to generate image data on driver characteristics. The generated image data may include, for example, blink rate, blink duration, head position and orientation, eye position, pulse rate, or other suitable driver performance indicators.

Controller 72 may be located on PCB 68, located elsewhere within housing 48, or elsewhere in the vehicle. Controller 72 may be in communication with processor 32. Controller 72 may be in communication with various devices incorporated in rearview assembly 24 and/or equipment of the vehicle. Controller 72 may be in communication with processor 32. Controller 72 may be configured to selectively activate the at least one light source 64 to project illumination onto a chosen illumination target and may further be configured to cause image acquisition by imager 28.

Images from scenes such as, for example, a scene to the rear of the vehicle, may be captured by imager 28 and shown on display element 60 of rearview assembly 24. The driver of the vehicle may adjust the position of rearview assembly 24 to avoid blind spots and to ensure the driver can easily see images from a desired field of view in rearview assembly 24.

Driver monitoring system 20 of rearview assembly 24 may be calibrated initially based on its initial position and orientation. This will enable driver monitoring system to, among other things, determine where the driver is looking. However, once rearview assembly 24 has been moved, driver monitoring system 20 may no longer be able to accurately determine what the driver is looking at. Once rearview assembly 24 has been moved from an initial position, there is a need to detect and quantify adjustments made to the position of rearview assembly 24. Recalibration of driver monitoring system 20 to compensate for changes in location and/or orientation may be desired. Detecting and quantifying any subsequent adjustments of rearview assembly 24 after the initial positioning may allow proper compensation to be applied.

The imager 28 for the driver monitoring system 20 and image data captured by imager 28 may be used to accomplish this function. Imager 28 may capture and register stationary landmarks in an image taken when imager 28 is initially being calibrated. If any subsequent adjustment occurs to the position and/or orientation of rearview assembly 24, the landmark locations in the image will change, and these changes can be used to quantify the adjustments made to rearview assembly 24. When a change is detected in the landmark locations in the image, a compensation may be determined and applied.

CAD file 40 of rearview assembly 24 may comprise details of interior portion of rearview assembly 24 and may include details of the interior of housing 48 including any ribs or supports, and other information. Imager 28 may be configured to capture images of the interior of rearview assembly 24 and to capture exterior landmarks, and may compare the images and landmarks with images stored in CAD file 40.

Controller 72 may be configured to import an image and identify features in the image that are known from the CAD drawings. Controller 72 may know the location of the features based on the information in the CAD file 40. Controller 72 may define a coordinate system based on the joint or joints at either end 52A, 52B of barrel 52. Controller 72 may be configured to estimate five angles: pitch, yaw, and roll at a first joint at one end of barrel 52 and pitch and yaw at the other end of barrel 52. All roll may be imputed to the first joint. First joint may be at one of first and second ends 52A, 52B of barrel 52, and second joint may be at the other of first and second ends 52A, 52B of barrel 52. If rearview assembly 24 has only one joint (i.e., if one end 52A, 52B of barrel 52 is secured fixedly and the other end 52B, 52A of barrel 52 is secured via a joint), controller 72 may be configured to assume both joints are co-located, or to assume there are two joints and one joint is not moveable.

Controller 72 may be configured to relate captured images to CAD file 40 to determine the relative position of rearview assembly 24 in relation to the original position. Intrinsic characteristics of imager 28, such as focal length, are known. Using that information and the image data from the captured images, controller 72 may be capable of calculating angles, based on the images captured by imager 28, and may use the calculated angles to determine the exact location and orientation of rearview assembly 24.

In some embodiments, rearview assembly 24 may house imager for driver monitoring system. The imager may be initially calibrated while the rearview assembly 24 is in a particular position. Any subsequent adjustments of the rearview assembly 24 may need to be detected and quantified so that proper compensation may be applied to allow the imager to match the initial calibration. A detailed CAD drawing of the interior of housing is available to determine the calibration required. Using the CAD drawing may allow the precise locations of interior features to be determined.

In order to go from images captured by imager 28 to angles calculated to controller 72 to determine the location and orientation of rearview assembly 24, controller 72 may be configured to define a coordinate system based on the joint(s) securing rearview assembly 24 to vehicle. Controller 72 may further be configured to identify at least one feature in CAD file 40 and to locate the same feature or features in rearview assembly 24. Controller 72 may then be configured to use that information to determine the five angles (two pitch angles, two yaw angles, and one roll angle). Once the angles have been determined, controller 72 may be configured to calculate the exact location and orientation of rearview assembly 24. Controller 72 may then be configured to re-calibrate driver monitoring system 20 using the new position information.

Barrel 52 extending between mount 44 and housing 48 may be assumed to have a joint at each end. The joint at the end of the barrel 52 at the housing 48 of rearview assembly 24 may be called "joint1" and its center may be considered the origin of the coordinate system ($[x,y,z]=[0,0,0]$). +z may point to the rear of the vehicle, +y may point downward toward the road, and +x may point sideways toward the drivers side of the vehicle. The axes may be aligned with the major axis of the CAD drawing of the interior of housing.

During the initial calibration, an image may be captured and at least one stationary image landmark may be identified. The at least one landmark may be disposed within housing of rearview assembly. Subsequent images may be captured, and it may be determined where the at least one landmark is. In some embodiments, it may be determined where the endpoints of at least one of the landmarks are. It may be determined that there has been movement in at least one landmark. When a change is detected in the position of one or more landmarks, the following steps may be applied to recalibrate the imager:

During the calculations, for simplification it may be assumed that the camera's focal point is at the center of adjustment ball joint of rearview assembly 24. The image taken during the initial calibration may be dewarped, and image coordinates may be established for each of the at least one landmarks. A coordinate system having point (0,0,0) at a focal point of the imager and rotations of (0,0,0) may be defined. Similar coordinates may then be calculated for each of the image coordinates that has been established. Once the similar coordinates have been calculated, the new image may be dewarped and new image coordinates may be established for each of the at least one landmarks. Using the new image coordinates, imager may be calibrated.

Memory 36 may be configured to store predetermined parameters for selected driver characteristics, for use while driver monitoring system 20 is monitoring a driver.

In some embodiments, controller 72 may compare the generated image data from the images captured during the driver monitoring mode with the predetermined parameters for the selected driver characteristics. In some embodiments, controller 72 may contain predetermined thresholds for allowable deviations between the captured images and the predetermined parameters. After comparing the generated image data with the predetermined parameters, controller 72 may determine whether the driver is exhibiting any signs that may indicate impairment.

In some embodiments, controller 72 may compare the image data generated from the images captured during the driver monitoring mode with image data generated from previously captured images. The previously captured images may be stored in the memory 36 of processor 32 of driver monitoring system 20. In some embodiments, controller 72 may contain predetermined thresholds for allowable deviations between the captured images and the stored images or the stored image data. After comparing, controller 72 may determine whether the driver is exhibiting any signs that the driver may be impaired.

A method for calibrating the imager 28 when any change is detected in the landmark locations in the image may comprise the following steps. In an initial step, imager 28 may capture an image of an interior portion of housing 48 of rearview assembly 24. From the CAD drawing, controller 72 may determine fixed line segments potentially in the camera's field of view and may determine the end points of these segments in terms of the coordinate system. In a given image frame of the captured images, controller 72 may look for these fixed segments in part or in their entirety and note the endpoints of these segments in the image domain.

In another step, the image taken during calibration may be dewarped. Assuming there are "N" landmarks, the image coordinates for each of the N landmarks may be established. The world coordinate system may be defined as 0, 0, 0 at the focal point of imager 28. In step 150, the initial rotations, when the driver monitoring system 20 was calibrated, may be defined as 0, 0, 0. Using this information, similar world coordinates may be calculated for each of the image coordinates determined previously. The new image may then be dewarped and new image coordinates for each of the "N" landmarks may be established. Position adjustment information may be determined for rearview assembly 24. Controller 72 may then apply the position adjustment information to images captured by imager 28. The position adjustment information is not only used by applications running in the rearview assembly 24 itself such as, for example, driver monitoring, but it can also be combined with the global vehicle orientation to know its orientation relative to the earth.

As used herein, a "rearview assembly" is a structure that may provide an image of a scene to the rear of a driver. Rearview assembly may additionally or alternatively include an electronic display element 60 that displays an image as sensed by a rearward facing camera or imager (see, for example, commonly assigned U.S. Pat. No. 6,550,949 entitled "SYSTEMS AND COMPONENTS FOR ENHANCING REAR VISION FROM A VEHICLE," filed on Sep. 15, 1998, by Frederick T. Bauer et al., the entire disclosure of which is incorporated herein by reference). Additionally or alternatively, rearview assembly may include both an electro-optic rearview assembly and a display element 60 for providing an image from a rearward facing camera or imager 28. Thus, a "rearview assembly" need not include a mirror element. In the embodiments described below, a rearview assembly is shown and described.

Rearview assemblies may include at least one of a rearview device and a video display element 60, mounted in housing 48, and a mount 44 that attaches housing 48 to the vehicle. The various components described below may be mounted in housing 48 of rearview assembly 24 or may be mounted in mount 44, with appropriate electrical connections made therebetween.

In some embodiments, the mount 44 may be configured to engage a button (not shown) fixedly attached to vehicle windshield or roof. However, it is also contemplated that the mount 44 may engage with the button or other connector secured to the vehicle in a variety of other manners, including twist-fit and interference connections. It is also contemplated that the mount 44 may be secured to the vehicle in a variety of other manners. It is also generally contemplated that other rearview assembly features may be included with rearview assembly 24. Some of these additional devices may include light sensors, rain sensors, compasses, microphones, etc. In some embodiments, rearview assembly 24 may further comprise an ambient light sensor (not shown) and a glare sensor (not shown).

Rearview assembly 24 may be designed for mounting directly to the vehicle windshield. Alternatively, rearview assembly 24 may be designed for mounting to the roof of the vehicle. As will become apparent to one skilled in the art from the description of the various functions below, the driver monitoring system 20 embodied in rearview assembly 24 may include various combinations of the elements identified above, and thus need not include each and every element shown and described. Further, although each of the elements may be housed within rearview assembly 24, some or all of the components may be provided in other remote locations and transmit and receive information over a vehicle bus or via RF transmissions.

The above description is considered that of the preferred embodiments only. Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

In this document, relational terms, such as first and second, top and bottom, front and back, left and right, vertical, horizontal, and the like, are used solely to distinguish one entity or action from another entity or action, without necessarily requiring or implying any actual such relationship, order, or number of such entities or actions. These terms are not meant to limit the element which they describe, as the various elements may be oriented differently in various applications. Furthermore, it is to be understood that the device may assume various orientations and step sequences, except where expressly specified to the contrary.

It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

It will be understood that any described processes or steps within described processes may be combined with other disclosed processes or steps to form structures within the scope of the present disclosure. The exemplary processes disclosed herein are for illustrative purposes and are not to be construed as limiting. It is also to be understood that variations and modifications can be made on the aforementioned methods without departing from the concepts of the present disclosure, and further it is to be understood that such concepts are intended to be covered by the following claims unless these claims by their language expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within at least one of 2% of each other, 5% of each other, and 10% of each other.

The invention claimed is:

1. A system for calibrating a driver monitoring system in a vehicle, comprising:
a rearview assembly comprising a housing and a mount, the mount secured to a vehicle surface, and a barrel having a first end and a second end and extending between the housing and the mount;
an imager capable of capturing images, the imager disposed in the rearview assembly;
a processor in communication with the imager;
a memory in communication with processor, the memory comprising a file containing information on stationary landmarks proximate the imager; and
a controller operable to:
receive images of the vehicle's interior that include an interior of the rearview assembly having at least one stationary image landmark disposed within the housing, and
calibrate the imager, where the calibration includes identifying a substantially stationary landmark in a first image used during an initial calibration;
wherein the controller is configured to re-calibrate the driver monitoring operations based, at least in part, on a detection of the substantially stationary landmark being in a different location in a second image relative to the first image.

2. The system of claim 1, wherein the file contains information on stationary landmarks within the housing of the rearview assembly.

3. The system of claim 1, wherein the first end of the barrel has a moveable joint connected to the mount.

4. The system of claim 1, wherein the second end of the barrel has a moveable joint connected to the housing.

5. The system of claim 1, wherein the controller is configured to import an image and identify at least one image feature in the image that corresponds with one of the stationary landmarks included in the file;
wherein the controller is configured to know the location of the features based on the information in the file; and
wherein the controller is configured to define a coordinate system based on the joint or joints at the ends of the barrel.

6. The system of claim 1, wherein the controller is configured to relate captured images to the file to determine the relative position of the rearview assembly in relation of the initial calibration.

7. The system of claim 1, wherein the controller is configured to determine a coordinate system based on the joint or joints securing the rearview assembly to the vehicle.

8. The system of claim 7, wherein the controller is configured to identify at least one feature in the file and to locate the same at least one feature in the rearview assembly.

9. The system of claim 8, wherein the controller is configured to use the location of the at least one feature to determine five angles, including two pitch angles, two yaw angles, and one roll angle.

10. The system of claim 9, wherein the controller is configured to, upon the determination of the five angles, calculate the location and orientation of rearview assembly.

11. The system of claim 10, wherein the controller is configured to re-calibrate the driver monitoring system by comparing a location of the substantially stationary landmark in the second image relative to the first image.

12. A method for calibrating a driver monitoring system comprising:
providing a rearview assembly having a driver monitoring system comprising an imager, and a memory comprising a file containing details on the interior architecture of the rearview assembly including the location of a plurality of stationary landmarks within the housing of the rearview assembly;
capturing images of the interior of the rearview assembly with the imager;
comparing the captured images with a file stored in memory containing details on the interior architecture of the rearview assembly;

calibrating the driver monitoring system using information gained from the comparison between the captured images and the stored images.

13. The method of claim 12, further comprising establishing image coordinates for the stationary landmarks within the rearview assembly.

14. The method of claim 12, further comprising defining initial rotations during an initial calibration of the driver monitoring system as 0, 0, 0.

15. The method of claim 14, further comprising dewarping the captured images and establishing new image coordinates for a plurality of the stationary landmarks.

16. The method of claim 15, further comprising determining position adjustment information for the rearview assembly.

17. The method of claim 16, further comprising applying position adjustment information to the captured images.

* * * * *